(12) United States Patent
Slevin et al.

(10) Patent No.: US 9,902,532 B2
(45) Date of Patent: Feb. 27, 2018

(54) METERED POURER

(71) Applicant: Disruptive Dosing Limited, Yorkshire (GB)

(72) Inventors: Peter Joseph Slevin, Yorkshire (GB); Adam Michael Robinson, Yorkshire (GB)

(73) Assignee: Disruptive Dosing Limited, Yorkshire (GB)

( * ) Notice: Subject to any disclaimer, the term of this patent is extended or adjusted under 35 U.S.C. 154(b) by 140 days.

(21) Appl. No.: 14/717,106

(22) Filed: May 20, 2015

(65) Prior Publication Data

US 2015/0251822 A1 Sep. 10, 2015

Related U.S. Application Data

(63) Continuation of application No. PCT/GB2013/053151, filed on Nov. 28, 2013.

(51) Int. Cl.
| | |
|---|---|
| *B65D 47/06* | (2006.01) |
| *G01F 11/26* | (2006.01) |
| *G01F 13/00* | (2006.01) |

(52) U.S. Cl.
CPC ............ *B65D 47/06* (2013.01); *G01F 11/265* (2013.01); *G01F 13/006* (2013.01)

(58) Field of Classification Search
CPC ..... B65D 47/06; G01F 11/265; G01F 11/263; G01F 13/006
See application file for complete search history.

(56) References Cited

U.S. PATENT DOCUMENTS

| | | | |
|---|---|---|---|
| 2,141,871 A | 12/1938 | Koukal | |
| 2,368,540 A | 1/1945 | Goodman | |
| 2,968,423 A | 1/1961 | Mahler et al. | |
| 3,070,266 A | 12/1962 | Chappell | |
| 3,129,859 A | 4/1964 | Chappell | |
| 3,321,113 A | 5/1967 | Conry | |
| 4,243,157 A | 1/1981 | Rettberg | |
| 4,407,435 A * | 10/1983 | Harmon | G01F 11/00 137/512.2 |

(Continued)

OTHER PUBLICATIONS

International Search Report dated Mar. 4, 2014 from International Application No. PCT/GB2013/053151.

(Continued)

*Primary Examiner* — Nicholas J Weiss
(74) *Attorney, Agent, or Firm* — Beyer Law Group LLP

(57) ABSTRACT

A pourer comprises a conduit having an inlet and an outlet; sealing means comprising a plurality of sealing members extending radially from the conduit and dimensioned to engage an interior surface of a bottle neck;
an air vent having an inlet and an outlet;
the inlet and outlet of each of the conduit and air vent being located on opposite sides of the sealing means;
wherein the pourer has no component with a diameter greater than a diameter to engage completely within the bottle neck. In this way, the pourer is configured to be inserted into a bottle neck without any part of the pourer extending outwardly from the bottle neck; and
wherein the conduit includes a chamber having a valve comprising an annular valve seat and a moveable member located in the chamber arranged to engage the valve seat to close the valve when the pourer is inverted.

14 Claims, 17 Drawing Sheets

(56) References Cited

U.S. PATENT DOCUMENTS

| | | |
|---|---|---|
| 4,984,719 A | 1/1991 | Brunton |
| 5,044,521 A | 9/1991 | Peckels |
| 5,961,008 A | 10/1999 | Peckels |
| 8,245,891 B2 * | 8/2012 | Eriksen .................. B65D 47/40 |
| | | 222/478 |
| 8,251,262 B2 * | 8/2012 | Peckels ................ B67D 3/0045 |
| | | 222/1 |
| 2005/0006418 A1 | 1/2005 | Rigel |
| 2010/0230447 A1 | 9/2010 | Eriksen |
| 2011/0036873 A1 | 2/2011 | Peckels |

OTHER PUBLICATIONS

Written Opinion dated Mar. 4, 2014 from International Application No. PCT/GB2013/053151.

* cited by examiner

METERED POURER

CROSS-REFERENCED TO RELATED APPLICATIONS

This Application is a Continuation of International Application No. PCT/GB2013/053151, filed on Nov. 28, 2013, which claims priority to GB Application No. 1221389.8, filed on Nov. 28, 2012, both of which are incorporated herein by reference in their entirety.

This invention relates to a pourer for use in facilitating pouring of a liquid from a bottle, particularly but not exclusively for reducing the likelihood of a surge of liquid or splashing during pouring into a drinking glass, to allow the velocity and direction of the liquid flow to be controlled and for the amount of liquid to be metered independent of the angular rotation of the bottle.

Pour spouts commonly comprise a cylindrical body member and a protruding spout. The body may be dimensioned to be received in various sizes of bottle neck. A disadvantage in use of such pourers is that the liquid in the bottle is permanently exposed to the ambient atmosphere. While this may not be a problem in a busy bar, there is a risk of spoilage or contamination, for example by insects in a less busy bar or domestic environment. Sealing mechanisms are known but these introduce complications and have varying degrees of effectiveness. Resealing with the original cap is a superior option but removal of the pourer after each use is inconvenient.

US 2010/0230447 discloses an aftermarket pour spout having a flange which extends out of the bottle neck. Such a pourer may be fitted after removal of the bottle cap. Alternatively a pourer may be fitted before the bottle is capped but this would make it necessary to alter the tooling of the capping apparatus to accommodate the increased length of the bottle neck.

According to a first aspect of the present invention a pourer comprises a conduit having an inlet and an outlet;

sealing means comprising a plurality of sealing members extending radially from the conduit and dimensioned to engage an interior surface of a bottle neck;

an air vent having an inlet and an outlet;

the inlet and outlet of each of the conduit and air vent being located on opposite sides of the sealing means;

wherein the pourer has a maximum diameter permitting it to be engaged completely within a bottle neck; and wherein the conduit includes a chamber having a valve comprising an annular valve seat and a moveable member located in the chamber arranged to engage the valve seat to close the valve when the pourer is inverted.

The pourer is preferably configured to be permanently inserted into a bottle neck in use without any part of the pourer extending outwardly from the bottle neck. The pourer is particularly intended to be used with conventional glass bottles or other bottles formed from rigid and inflexible material. Such a pourer may be inserted during manufacture for example prior to capping of a bottle.

The pourer is preferably configured so that it may be located within a bottle neck coplanar with or slightly below the bottle lip. In such an arrangement, a seal may be formed with the underside of the cap, preferably a screw cap. The upper surface of the pourer may include an annular or disc shaped upwardly facing sealing surface, for example, composed of polymeric or elastomeric resiliently deformable material to engage the sealing surface of the cap.

The moveable member may comprise a ball or disk composed of sufficiently dense material so that it moves downwardly to engage the valve seat and close the valve when the pourer is inverted.

The pourer is preferably used for pouring a bottled liquid, for example, a bottled alcoholic beverage including spirits or liqueurs.

According to a second aspect of the present invention there is provided a bottle having a neck and a pourer in accordance with the first aspect located wholly within the neck. The bottle may further include a cap or cork stopper closing the neck.

In a first embodiment a closing baffle may be provided at the outer end of the conduit, arranged to be located within the neck of the bottle in use and co-planar with the rim of the neck. The baffle may have one or more apertures to permit air flow to the air vent, particularly if the air vent is located further within the bottle neck relative to the pourer outlet.

The baffle may serve as a drip guard. A plurality of apertures which serve as air intakes may be located to form an annular array around the conduit.

The air vent preferably has a cross sectional area smaller than the conduit. Preferably the air intake has a smaller diameter. This serves to restrict liquid flow into the intake due to surface tension and viscosity of the liquid.

One embodiment of the air intake comprises an annular passageway. For example, the conduit and air intake may be provided as two concentric tubes. The narrow dimension of such an air intake may serve to minimise fluid ingress during use.

In a preferred embodiment the sealing members are arranged to be located within the bottle neck in spaced relation to the opening of the bottle neck, the conduit extending towards the opening and having an outlet generally co-planar with the bottle opening, a circular baffle having an external surface generally co-planar with the conduit opening.

In such an arrangement the baffle closes the bottle opening, preventing ingress of unwanted material into the pourer, particularly into the air vent. The air vent is located in or adjacent the sealing means so that the vent is in spaced relation to the outlet and baffle.

The baffle engages the interior of the cap in use to allow the bottle to be resealed after use.

Various pourers having ball valves have been disclosed in which the pourer and valve component extends beyond the mouth of the bottle neck. Many of these arrangements require the bottle to be tipped at a correct speed and orientation in order to ensure a metered quantity of liquid is delivered. A disadvantage of prior art arrangements is that the pourer and valve assembly is quite bulky and occupies a large volume so that it may not be received within the neck of a conventional bottle. Previously disclosed pourers are generally directional in use and require a comparatively large amount of materials in their construction.

It is an object of the present invention to provide a metered dose pourer which may be wholly or substantially located within the neck of a conventional bottle, preferably to allow existing commercial spirit or liqueur bottles to be used without any need for modification of the capping apparatus.

The dimensions of the conduit air intake and openings into the conduit are controlled so that the time taken for the movement of the moveable member towards the valve seat allows a predetermined volume of liquid to flow through the pourer.

This arrangement provides a simple construction using a minimum number of components and constructional materials in order to maximise the available volume within the bottle after the pourer is inserted.

In a first preferred embodiment the conduit extends axially inwardly from the sealing means, the conduit including the valve seat, the moveable member being moveable within the conduit between an open position remote from the valve seat and a closed position in which the moveable member engages the valve seat to close the valve.

The conduit preferably includes one or more inlets arranged to allow a flow of liquid into the conduit when the moveable member is not in the closed position.

Preferably liquid flow into the conduit is permitted as the pourer is tilted until the moveable member reaches the closed position.

In preferred embodiments the moveable member comprises a steel or other metal or ceramic ball or a steel or ceramic disk, having a radial dimension sufficiently small to permit passage along the cylindrical conduit. The rate of movement of the ball or disk shaped member may be controlled by selection of a suitable length of conduit and clearance between the moveable member and the interior wall of the conduit. In this way the amount of liquid dispensed may be selected by controlling the time taken for the valve to close as the pourer is tipped.

In pourers in which the moveable member has a disk-shaped configuration, the disk may be annular and arranged to slide along an axial guide.

The chamber may be integral with the air vent so that the air vent extends from the pourer to an outlet inwardly of the sealing means and communicating with the interior of the bottle to which the pourer is fitted.

The air vent preferably extends inwardly from the sealing means by a sufficient distance so that the flow of air from the outlet into the bottles does not disturb the flow of liquid into the conduit inlet.

In an alternative embodiment, the chamber may comprise a valve unit provided for attachment to an air vent of an existing pourer, for example, as disclosed in our UK patent application number GB 1215732.7, the disclosure of which is incorporated into the specification by reference for all purposes.

The valve unit may comprise a cylindrical tube defining a chamber having an attachment for engagement to the outlet of the air vent, for example, a socket or clip may be dimensioned to receive and engage the outlet.

In particularly preferred embodiments the axial guide may be a tubular air vent having an inlet communicating with the exterior of the pourer and an outlet communicating with the interior of the bottle in use. This arrangement is advantageous because the air vent is located axially and is not affected by the angular orientation of a bottle into which the pourer is engaged.

In a first preferred embodiment a single ball or disk member is employed with the valve seat being located adjacent an interior surface of the closing member. Such an arrangement affords a cost efficient construction and provides simplicity in use.

In an alternative embodiment the conduit includes a second valve arranged at the inner end thereof. The second valve may comprise a valve seat and moveable member arranged to close the inner end of the conduit when the pourer is inverted. This arrangement serves to control the rate of liquid flow into the conduit behind the moveable member as the pourer is inverted. This serves to further improve the accuracy of the fall speed of the moveable member and consequently the accuracy of metered dosing.

The pourer of this invention has the advantage that it may be inserted into a bottle neck after filling and prior to capping of the bottle, without any need for alteration of the tooling of a capping apparatus. Use in bottles closed by cork stoppers is also facilitated because the pourer may be located a sufficient distance within the bottle neck to accommodate a cork.

The pourer, being wholly located within the neck may be concealed by the foil wrapper or label applied to the neck of the bottle.

Alternatively the pourer may include a formation extending from the bottle neck and arranged to cooperate with a cap to seal the bottle.

The conduit preferably comprises a cylindrical tube extending from an inlet located inwardly of the sealing means to an outlet located outwardly of the sealing means.

Use of an axial conduit is preferred. This has the advantage that the rate of pouring is independent of rotation of the bottle.

The sealing means preferably comprises an array of radially extending resilient flanges arranged in axially spaced relation, the diameter of each flange being selected to allow liquid-tight engagement with an interior surface of a bottle neck. A pourer may be configured for use with a particularly dimensioned bottle. A selection of pourers may be provided for use with a range of bottles, for example as used by a particular drinks manufacturer. The sealing means may have flexible flanges to accommodate a range of common bottle sizes.

In a first embodiment of the invention the outlet of the conduit is located outwardly of the sealing means so that the conduit extends outwardly of the sealing means to form a pourer tube.

In a second embodiment the conduit has an outlet generally co-planar with an outer surface of the sealing means.

In a third embodiment the inlet of the conduit may be located inwardly of the sealing means so that the conduit extends inwardly of the sealing means to form an inlet tube.

In a fourth embodiment the conduit has an inlet generally co-planar with an inner surface of the sealing means.

In a particularly preferred pourer the second embodiment is present together with the third embodiment. Alternatively the first embodiment may be present together with the fourth embodiment. In such pourers the conduit has a sufficient length to permit controlled flow of liquid from the bottle.

Any combination of the first or second together with the third or fourth embodiments may be employed. However preferred pourers have the location of the conduit outlet and air intake configured so that the air and liquid flows are kept separate during pouring of the liquid, preferably irrespective of the rotational orientation of the bottle.

In an embodiment in which the conduit extends inwardly of the sealing means, one or more inlets may be provided in the conduit adjacent the sealing means. One or more, preferably two opposed apertures may be dimensioned to control the maximum rate of liquid flow. The apertures may also be configured to facilitate drainage of the last quantity of liquid from a bottle in use. The apertures may be located on opposite sides of a tubular conduit to improve drainage at any orientation of the bottle.

The conduit may extend inwardly from one or more inlets. An auxiliary inlet may be located at the inner end of the conduit.

The auxiliary inlet may serve to equalise pressures created within the bottle neck and conduit during pouring. The size of this aperture controls both the flow rate of liquid entering the conduit and the fall rate of the moveable member as the pourer is inverted.

Preferably the conduit extends outwardly of the sealing means by a distance greater than the distance of the inlet of the air vent from the sealing means. This ensures that liquid pouring from the outlet does not enter the inlet of the air vent to avoid choking of the air vent.

In preferred embodiments, the distance of the outlet is more than 1 mm, preferably 5-50 mm, more preferably 10-50 mm, from the sealing means. The distance may be more than twice, preferably more than three times, the internal diameter of the conduit.

In a further embodiment, the outlet of the air intake extends inwardly of the sealing means by a distance sufficient to prevent bubbles from entering the conduit or becoming entrained in the liquid flow into the inlet and provides suction at the inlet.

The distance of the air intake may be preferably 5-50 mm, more preferably 10-50 mm, from the sealing means.

In a preferred embodiment the sealing members may extend radially from a generally cylindrical body, the body having an internal cavity communicating with the inlet of the conduit. The cavity may be cylindrical or conical in shape. The cavity may serve to provide a funnel to direct a flow of liquid into the conduit. In addition, the hollow sealing means decreases the available volume within the bottle neck that is occupied by the pourer.

In preferred embodiments the air vent extends parallel to the pourer axis at a radial distance greater than the circumference of the conduit. The air vent may be located circumferentially of the pourer. A plurality of circumferentially located air vents may be provided.

In an alternative embodiment of the invention the pourer further comprises sealing means having an annular bearing and a pourer body rotatably mounted within the bearing;

the pourer body including a radially asymmetric weight, arranged so that the pourer body rotates as the bottle is rotated in a horizontal orientation;

the air intake being located diametrically opposite the weight.

In such an embodiment the conduit may be located circumferentially rather than axially of the pourer body.

According to a second aspect of the present invention there is provided a bottle having a neck fitted with a pourer in accordance with the first aspect of the present invention and sealed with a screw cap.

Use of a pourer in accordance with this invention confers several advantages. The quantity of a liquid poured from a bottle may be controlled, avoiding splashing and reducing the likelihood of an unnecessarily portion being supplied independent of the rotational angle of a bottle or if a bottle is rotated during pouring. This may be particularly beneficial if alcoholic spirits are being poured and the consumer does not wish to over indulge. The pourer may be inserted into the bottle during the bottling process, but does not impede application of a screw cap or a cork stopper inserted into the neck. Re-tooling of bottling apparatus is avoided. Furthermore, the pourer may be concealed by the foil wrapper applied to the neck of a bottle or by a suitable label.

It is not necessary that the pourer dispense a measure sufficiently accurately to comply with legal requirements, although preferred embodiments of the invention may achieve this degree of reproducible accuracy. In alternative embodiments, the measure of liquid is determined sufficiently accurately to allow a user to monitor his or her alcohol intake as an aid to avoid excessive consumption.

The invention is further described by means of example, but not in any limitative sense, with reference to the accompanying drawings, of which:

Figure 1:
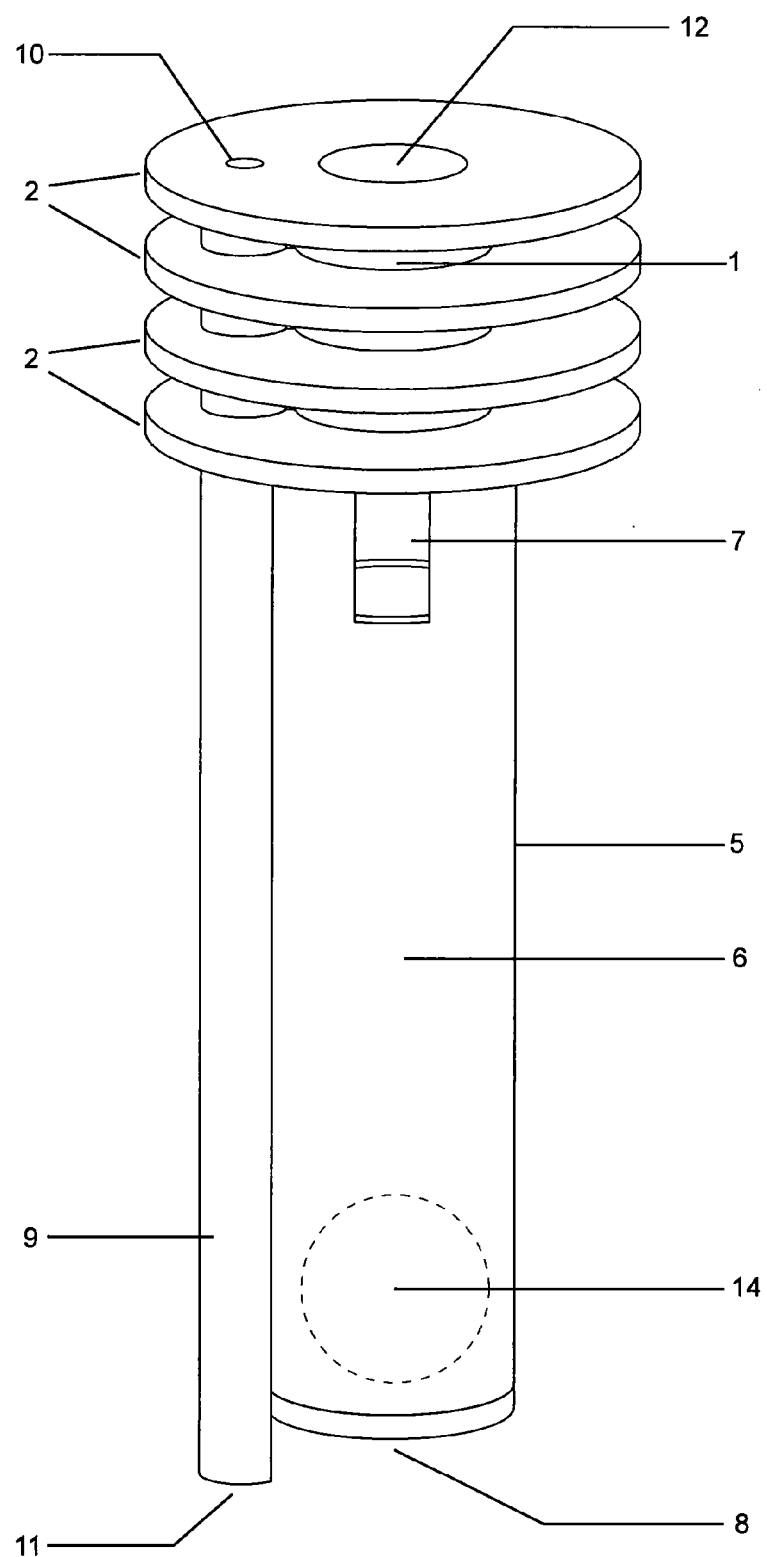
FIG. 1 is a perspective view of a first pourer in accordance with this invention.
Figure 2:
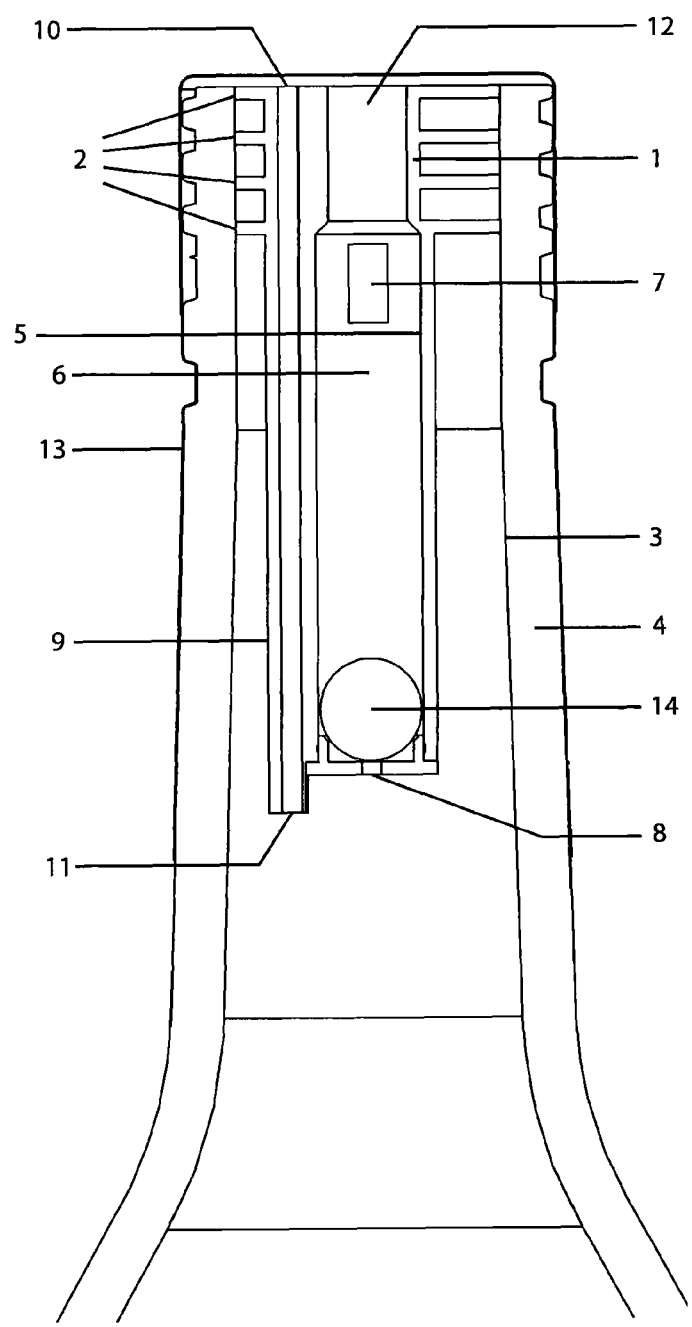
FIG. 2 is a cross sectional view of the pourer inserted into the neck of a bottle.
Figure 3:
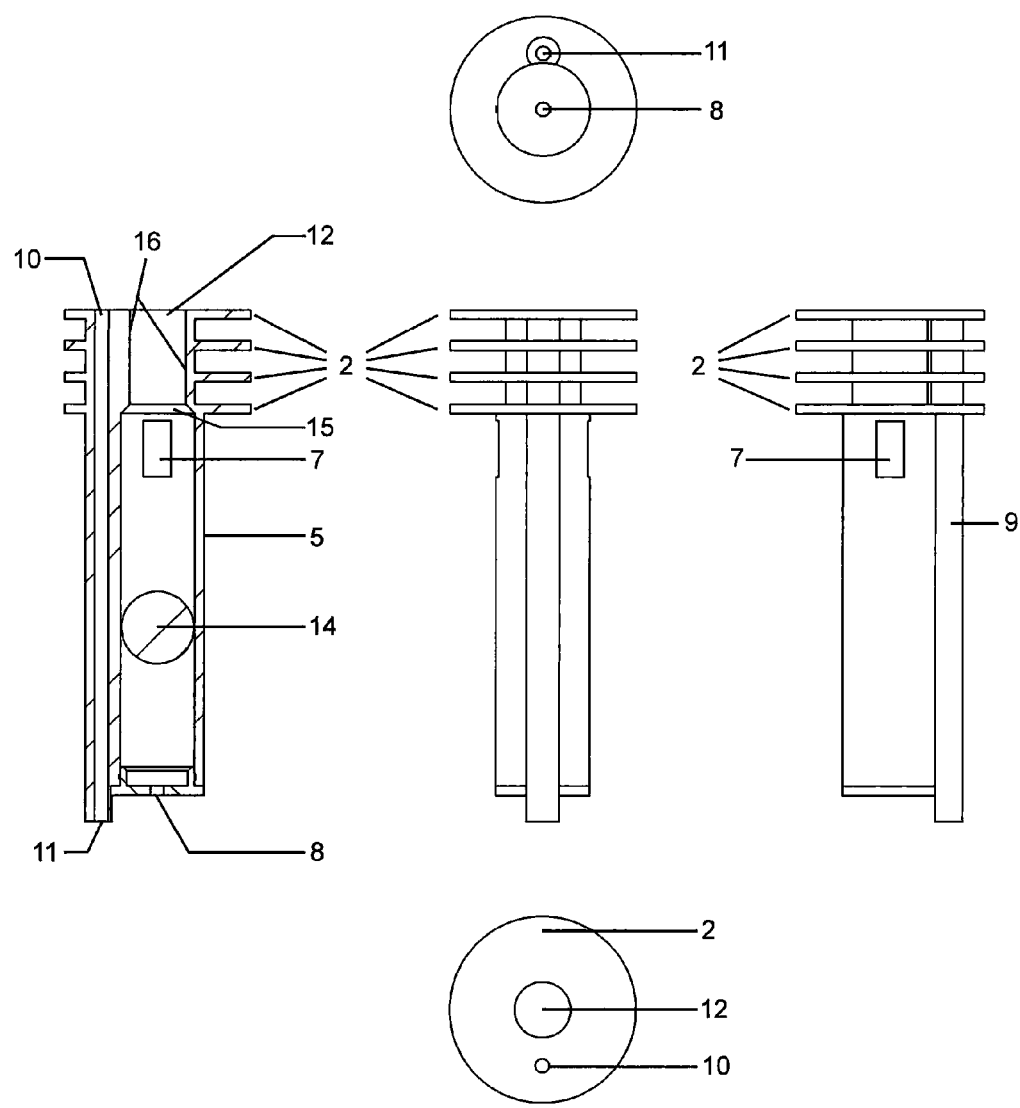
FIG. 3 shows views of the pourer shown in FIG. 1.

FIGS. 1-3 show a first pourer in accordance with this invention. A cylindrical body (1) disposed axially of the pourer. Four cylindrical disk-like flanges (2) extend radially from the body (1) and are dimensioned to engage an inner surface (3) of a bottle neck (4) as shown in FIG. 2.

The body (1) forms a cylindrical conduit (5) extending axially of the pourer and bottle neck in use. A cylindrical inlet conduit (6) extends inwardly into the bottle neck in use, downwardly as shown in the Figures. The inlet conduit (6) has rectangular primary inlet openings (7) disposed on diametrically opposite sides of the conduit (6) adjacent the inner surface of the innermost sealing means (2). The conduit (6) has a further opening (8) at the innermost end. This may serve as a secondary inlet.

An air vent (9) extends from an inlet (10). The inlet is co-planar with the outer surface of the sealing means. The air vent has an outlet (11) facing inwardly of the pourer on the inner side of the sealing means. In the embodiment shown, the conduit (6) and air vent (9) have a similar axial length so that the air inlet (10) and conduit outlet (12) are generally co-planar with the sealing ring (2). The conduit inlet (8) and air outlet (11) are located at generally the same axial distance from the sealing means (2) or, as shown, the air outlet may be slightly longer.

A steel ball (14) is captive within the conduit (6) and may slide along the conduit from an open position as shown in FIG. 1, wherein the ball engages the end of the conduit adjacent the inlet (8) and a closed position when the pourer is inverted. A valve seat (15) is formed as an annular shoulder between the wider conduit (5) and the wall (16) of the pourer outlet (12). As the pourer is inverted the ball (14) moves towards the valve seat (15) causing a flow of liquid from the outlet (12). When the ball (14) engages the valve seat (15) the flow of liquid is terminated and the pourer may then be returned to the upright position for further use.

In use the sealing means may be inserted into the neck of a bottle either before or after filling of the bottle, so that the sealing means is wholly located within the neck of a bottle, without leaving any part of the sealing means extending beyond the neck. In the embodiment shown, the pourer may be concealed by the bottle cap and foil covering (13 of FIG. 2) applied to the outer surface of the bottle neck.

Figure 4:
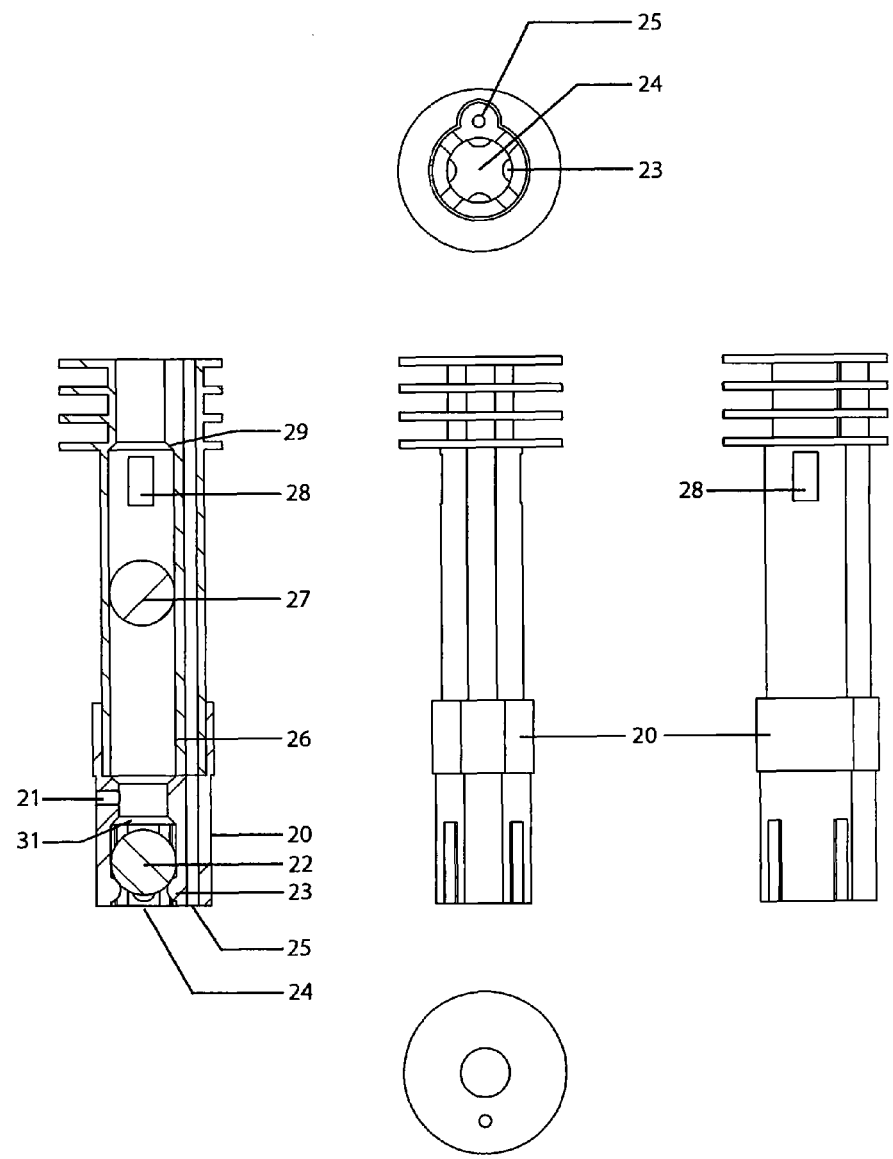
FIG. 4 shows various views of a second pourer.

FIG. 4 shows a second pourer in accordance with this invention. The pourer has a configuration generally similar to the first embodiment except that a second ball valve is provided to control liquid flow into the conduit.

The second valve comprises a sleeve (20) fitted onto the end of the conduit (26) and housing a second ball (22) retained by inlet (23) extending radially inwardly into an auxiliary inlet (24) axial of the pourer assembly. A liquid inlet (21) provides a flow of liquid and air as the first ball (27) lies upwardly or downwardly within the conduit tube (26). Rectangular liquid intakes (28) allow liquid to flow into the conduit until the ball (27) engages the valves seat (29) in the inverted position.

In the inverted position the second ball (22) engages a second valve seat (31) closing the inlet (24) restricting the flow of liquid into the conduit (26). The fall rate of ball (27) is therefore controlled by the flow rate of the liquid into conduit (26) behind the falling ball (27). The predetermined dimensions of inlet (21) allow this control. When returned to the upright position, the second ball (23) falls freely to the end of sleeve (20) allowing opening of the valve seat (31). This permits drainage of any liquid within conduit (26) back into the bottle.

Figure 5:
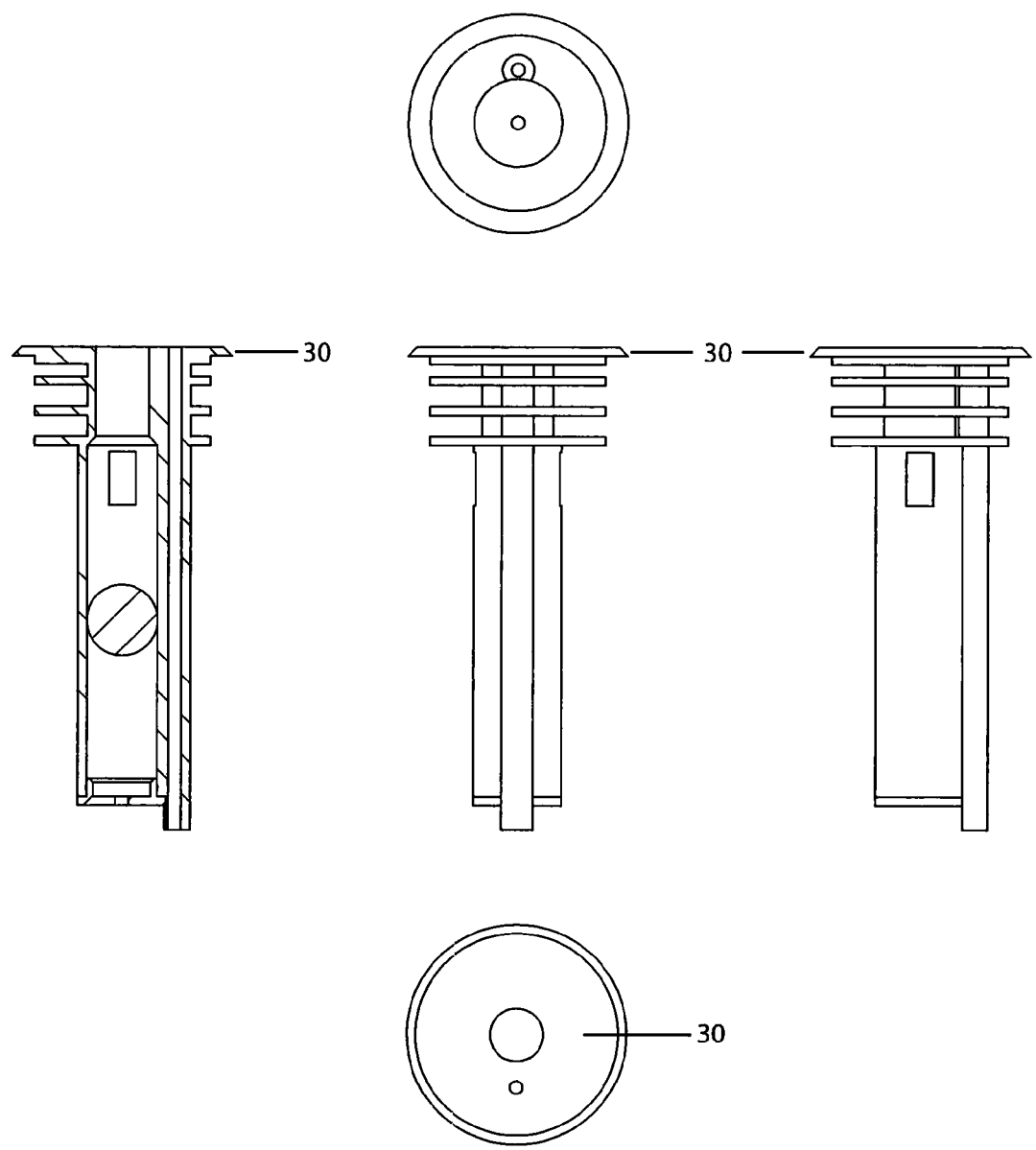
FIG. 5 shows various views of a further pourer.

FIG. 5 shows a further embodiment similar to that shown in FIG. 1 with the difference that a cap (30) extends radially outwardly from the top outer portion of the pourer in order to cover the rim of a bottle neck. Such an arrangement protects the bottle neck from accidental damage and can promote sealing upon replacement of the bottle cap after a drink has been poured.

Figure 6:
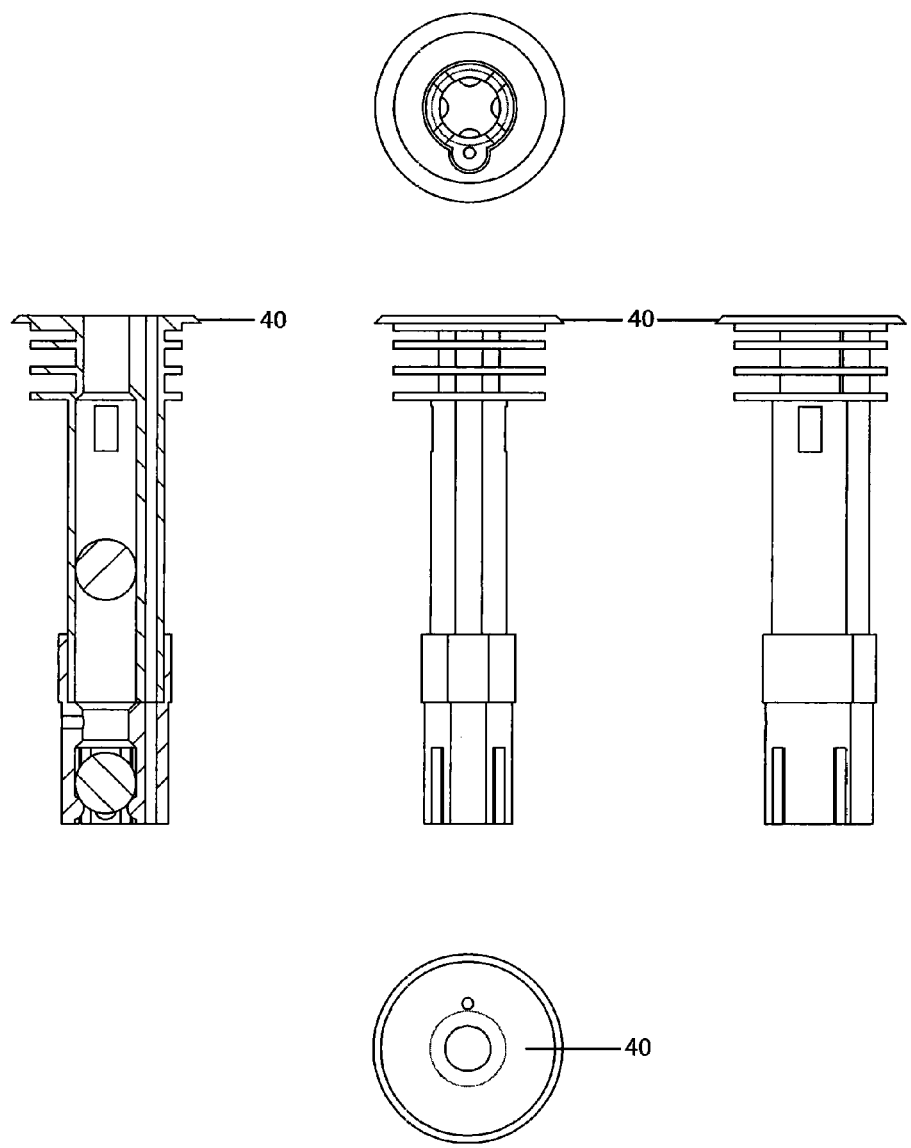
FIG. 6 shows various views of a further pourer.

FIG. 6 shows an embodiment similar to that of FIG. 4 with a cap (40) extending radially outwardly to cover the rim of a bottle neck in the same way as for the embodiment shown in FIG. 5.

Figure 7:
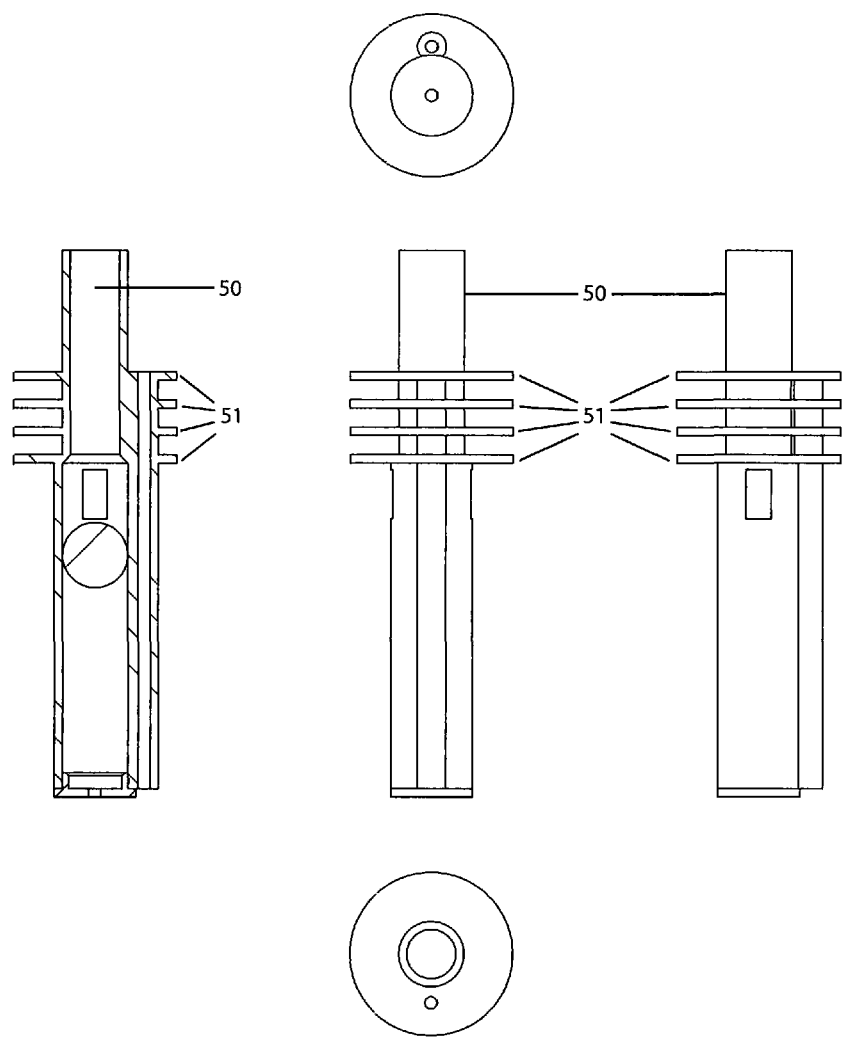
FIGS. 7 to 14 show various views of further pourers.

FIG. 7 shows a pourer similar to that shown in FIGS. 1 to 3, with the addition of a spout (50) extending beyond the sealing means (50). In this embodiment the pourer may be inserted into the bottle neck to a greater depth so that the spout (50) does not protrude from the neck.

Figure 8:
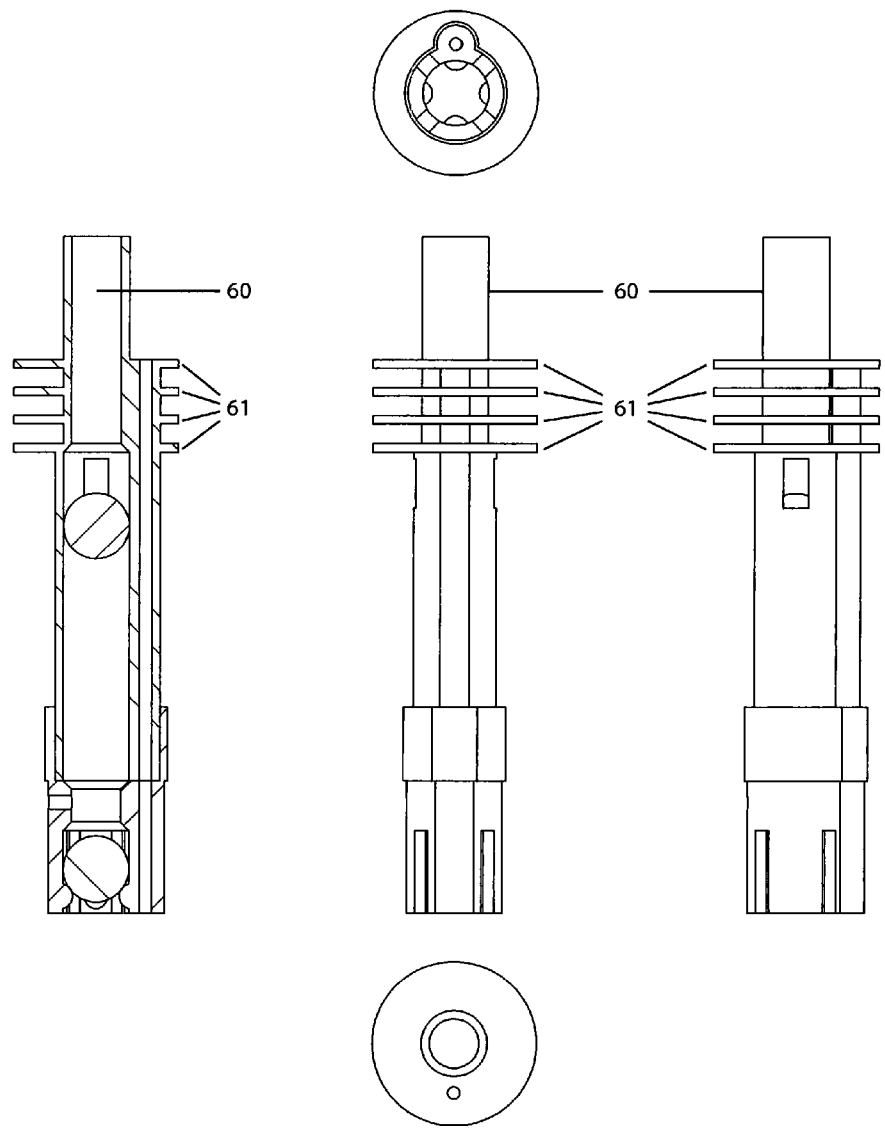

FIG. 8 shows a further embodiment similar to that shown in FIG. 4 but with provision of a spout (60) extending outwardly from the sealing means (61) as described with reference to FIG. 7.

Figure 9:
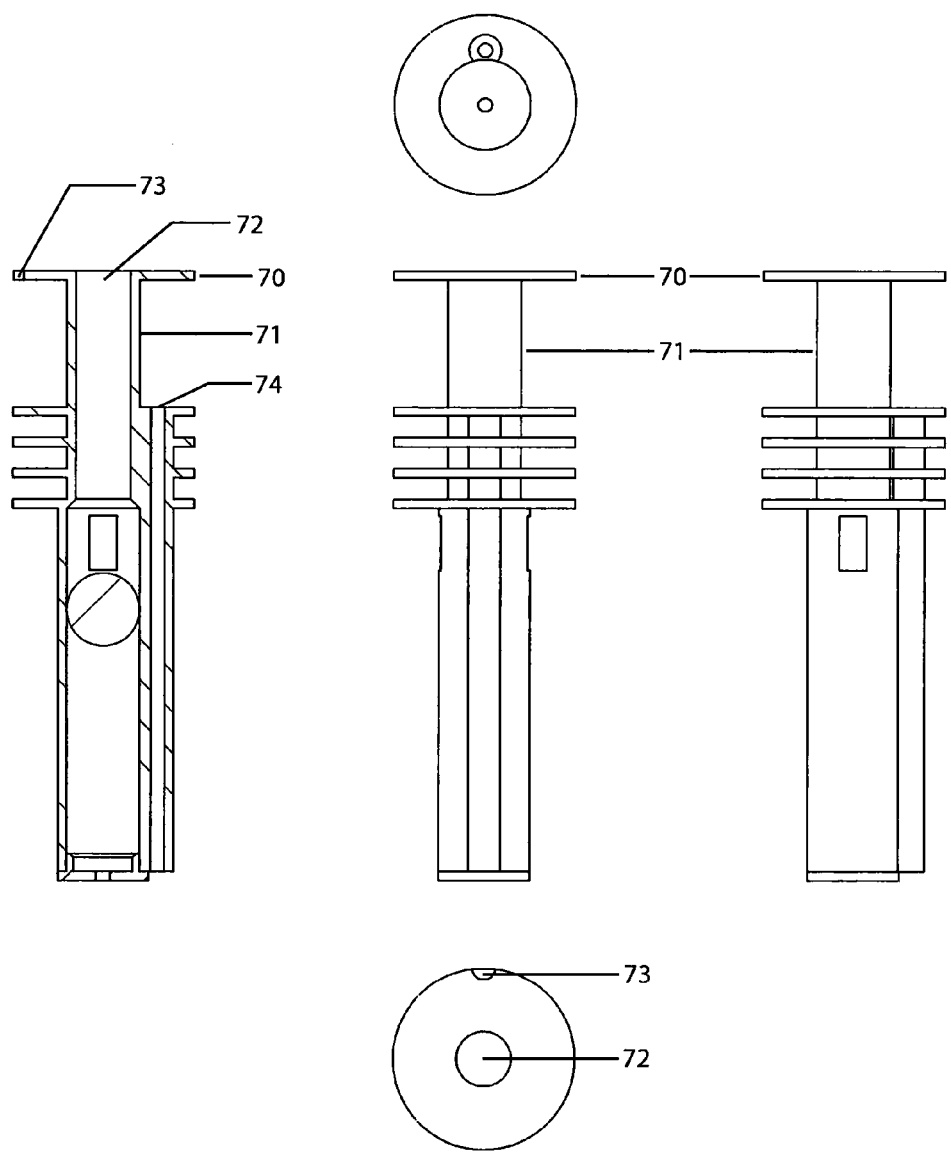

FIG. 9 shows a further pourer in accordance with this invention, generally similar to the pourer shown in FIGS. 1-3, with the addition of a baffle (70) located on the outer end of spout (71) to form a drip guard extending from the conduit outlet (72) to a circumferential rim configured to be adjacent or to engage the interior of the bottle neck.

The sealing members are arranged to be located within the bottle neck in spaced relation to the opening of the bottle neck, the conduit extending towards the opening and having an outlet generally co-planar with the bottle opening, a circular baffle having an external surface generally co-planar with the conduit opening. The baffle closes bottle opening preventing ingress of unwanted material into the pourer. The air vent is located in or adjacent the sealing means so that the vent is in spaced relation to the outlet and baffle.

A circumferential rebate (73) in the circumference of the rim serves to permit flow of air from the exterior to the intake (74) of the air vent (75). The aperture (73) is preferably located diametrically opposite to the air intake (74) to reduce the risk of entry of liquid into the air intake (74).

Figure 10:
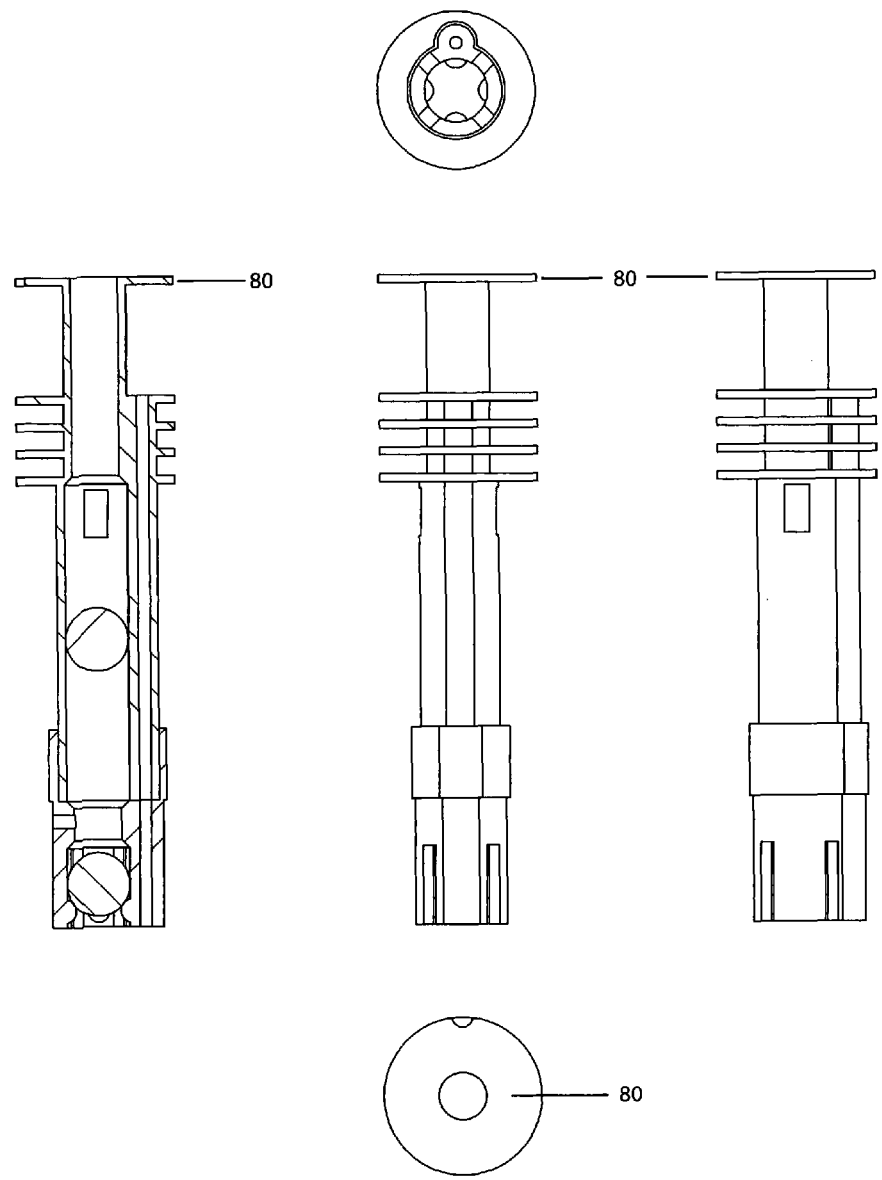

FIG. 10 shows a further embodiment similar to that shown in FIG. 8 with the addition of a baffle (80) as described in relation to FIG. 9.

Figure 11:
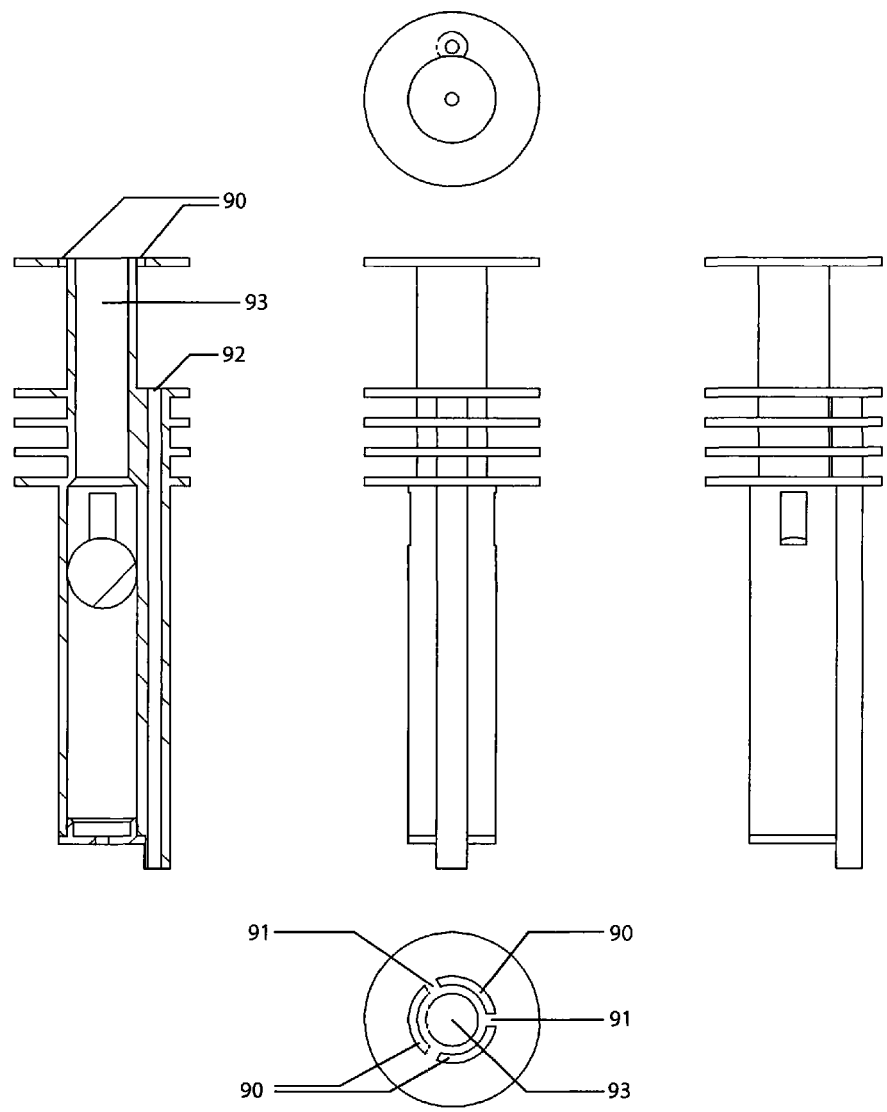

FIG. 11 shows a further embodiment generally similar to that shown in FIG. 9. In this embodiment the baffle has an annular aperture (90) divided into three segments by bridging members (91) to allow passage of air through the baffle (90) to air intake (92). The annular aperture (90) located around the outlet (93) forms a conduit to allow passage of air irrespective of the angular position of the bottle neck.

Figure 12:
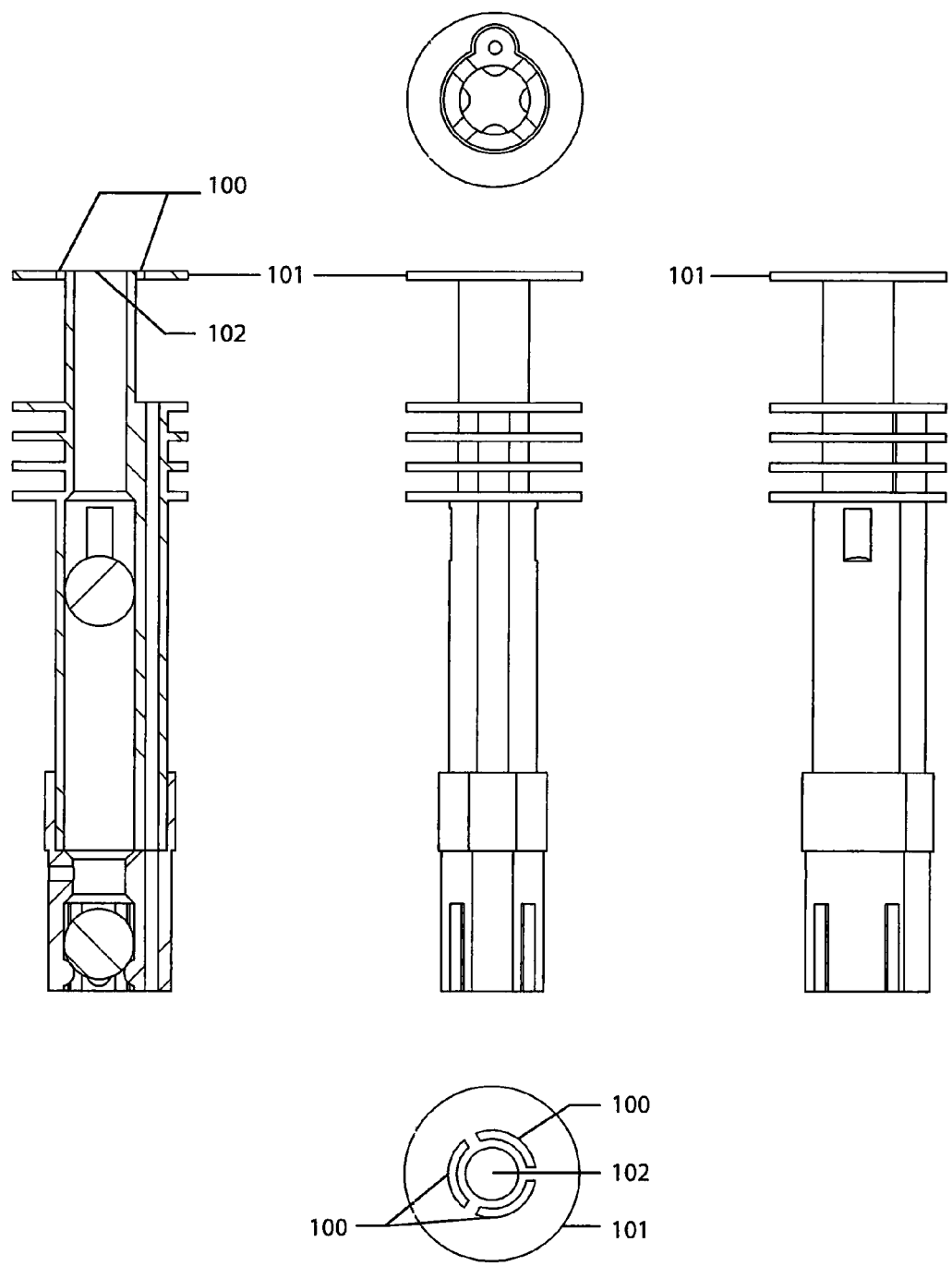

FIG. 12 shows a further embodiment generally similar to FIG. 10 but having an annular aperture (100) in the baffle (101) surrounding the outlet (102) of conduit (103) as described in the embodiments shown in FIGS. 11.

Figure 13:
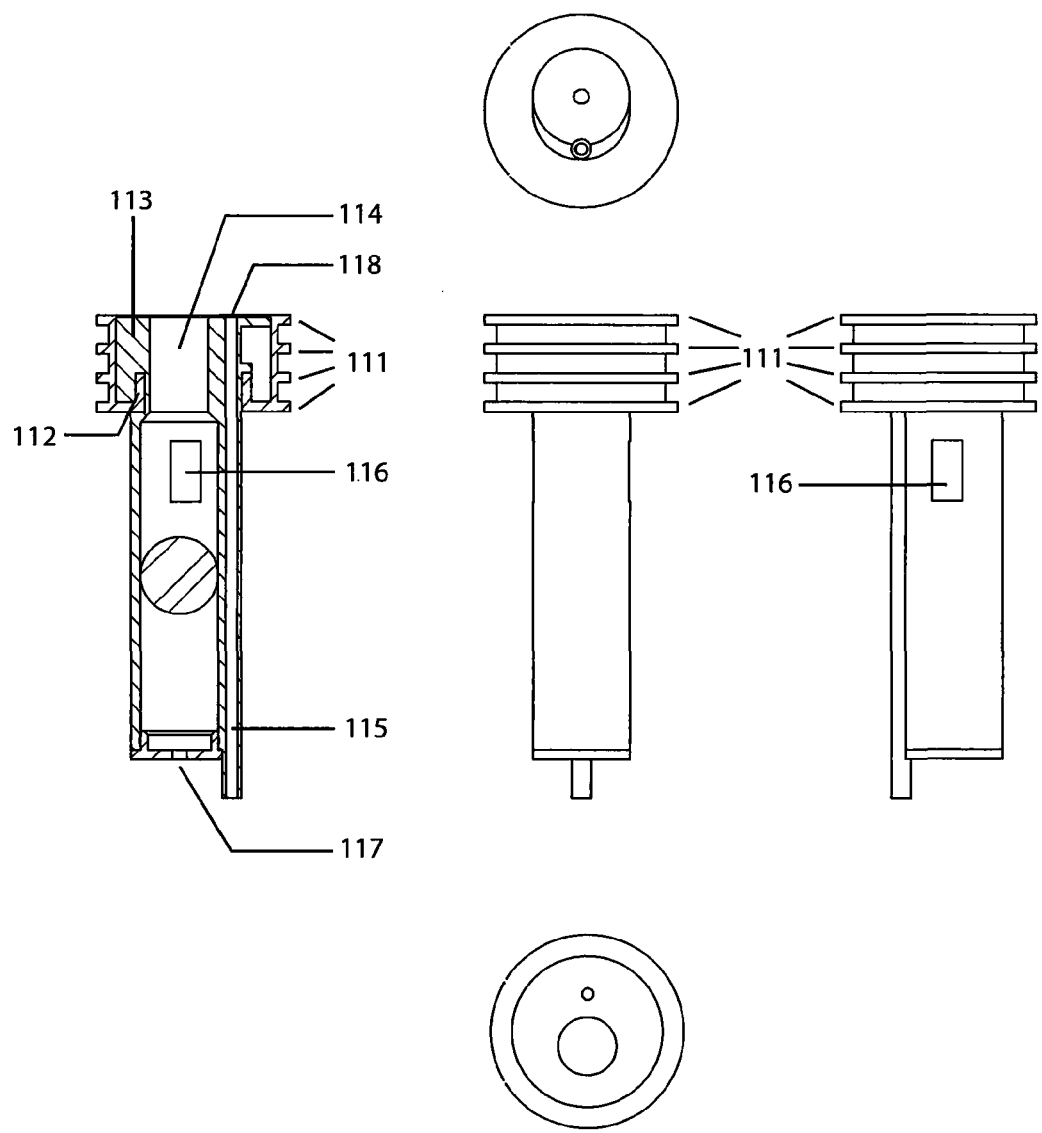

FIG. 13 shows a further embodiment of the invention wherein the pourer is formed in two parts. The sealing means encompasses a cylindrical body (110) having outwardly extending sealing members (111) configured to engage the inner surface of a bottle neck (not shown). The body (110) forms a cylindrical collar (112) upon which a rotatable cylindrical member (113) is received. The cylindrical member (113) has a conduit outlet (114) and air intake (115) as described in the previous embodiments. A conduit inlet tube (115) has a pair of diametrically opposed rectangular inlets (116) and a downwardly extending portion having an auxiliary inlet tube (117) at the lower end. The cylindrical member (113) has an eccentric configuration and is loaded with a heavy weight so that it rotates to a selected orientation when the bottle neck is horizontal. In the selected orientation, the air intake (115) is located above the conduit (114) so that liquid poured from the conduit does not enter the inlet (118) of air intake (115).

Figure 14:
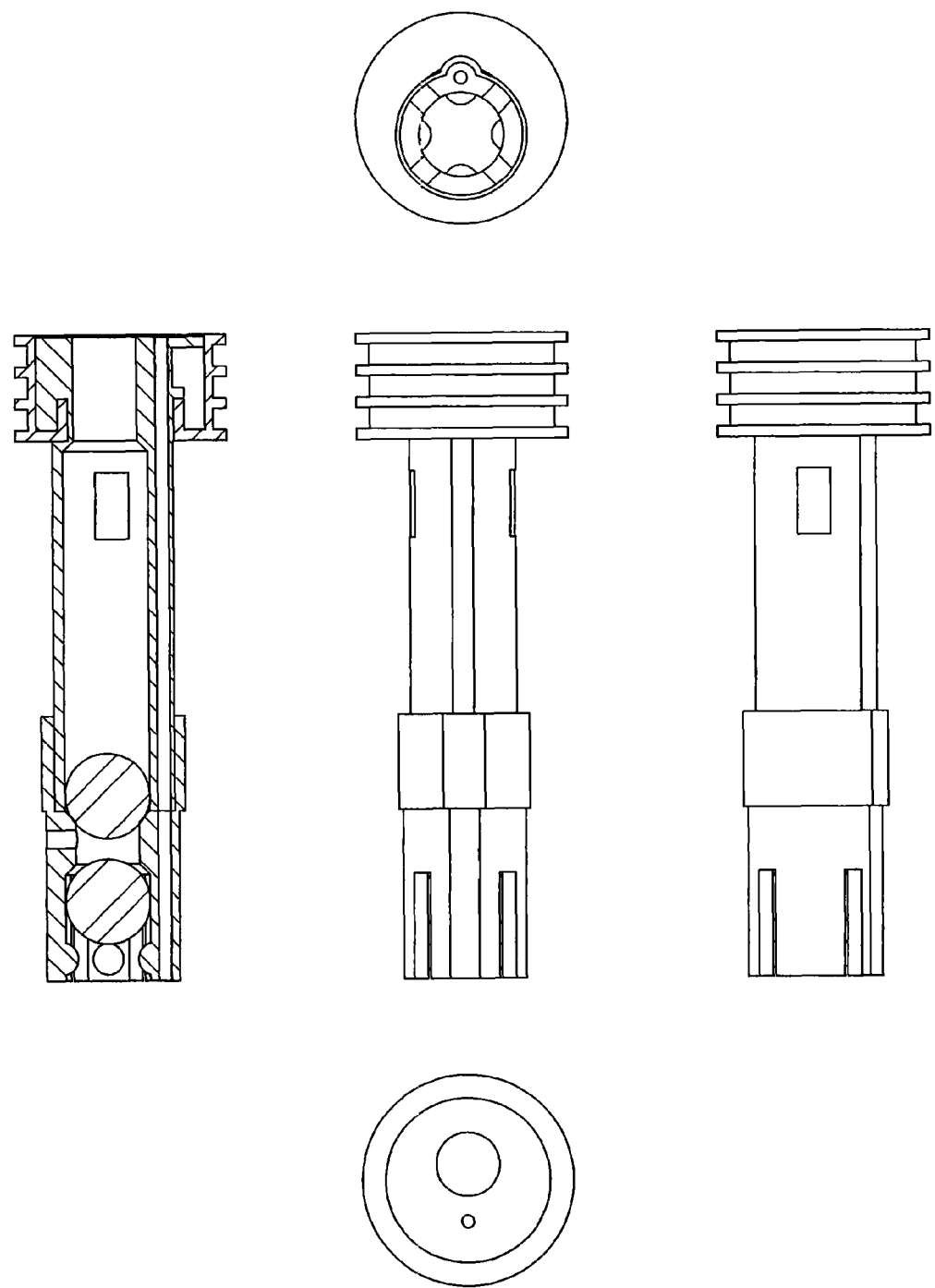

FIG. 14 shows an embodiment generally similar to that shown in FIG. 13 wherein a double ball valve is provided similar to that shown in FIGS. 10 and 12.

Figure 15:
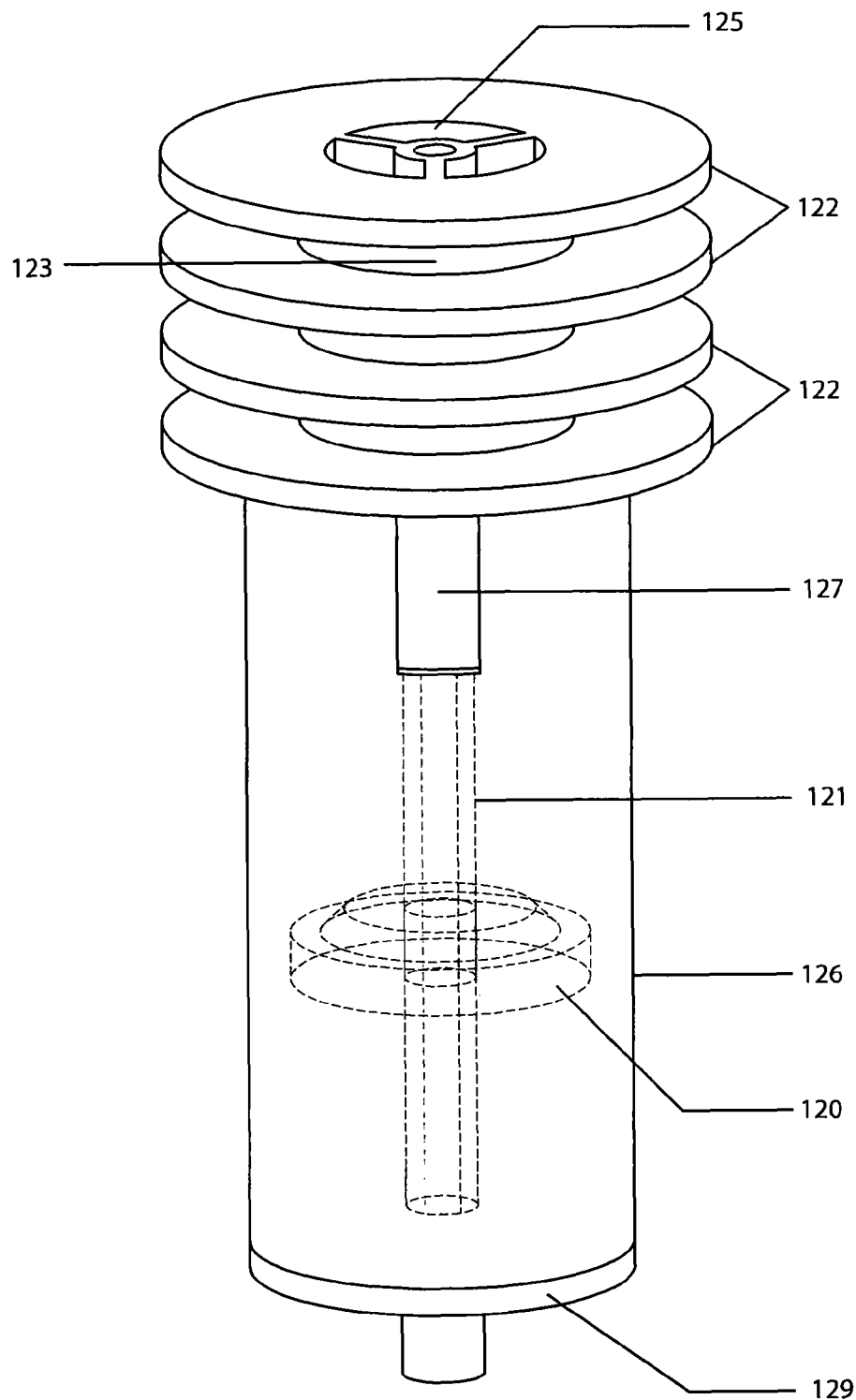
FIG. 15 is a perspective view of an alternative pourer.
Figure 16:
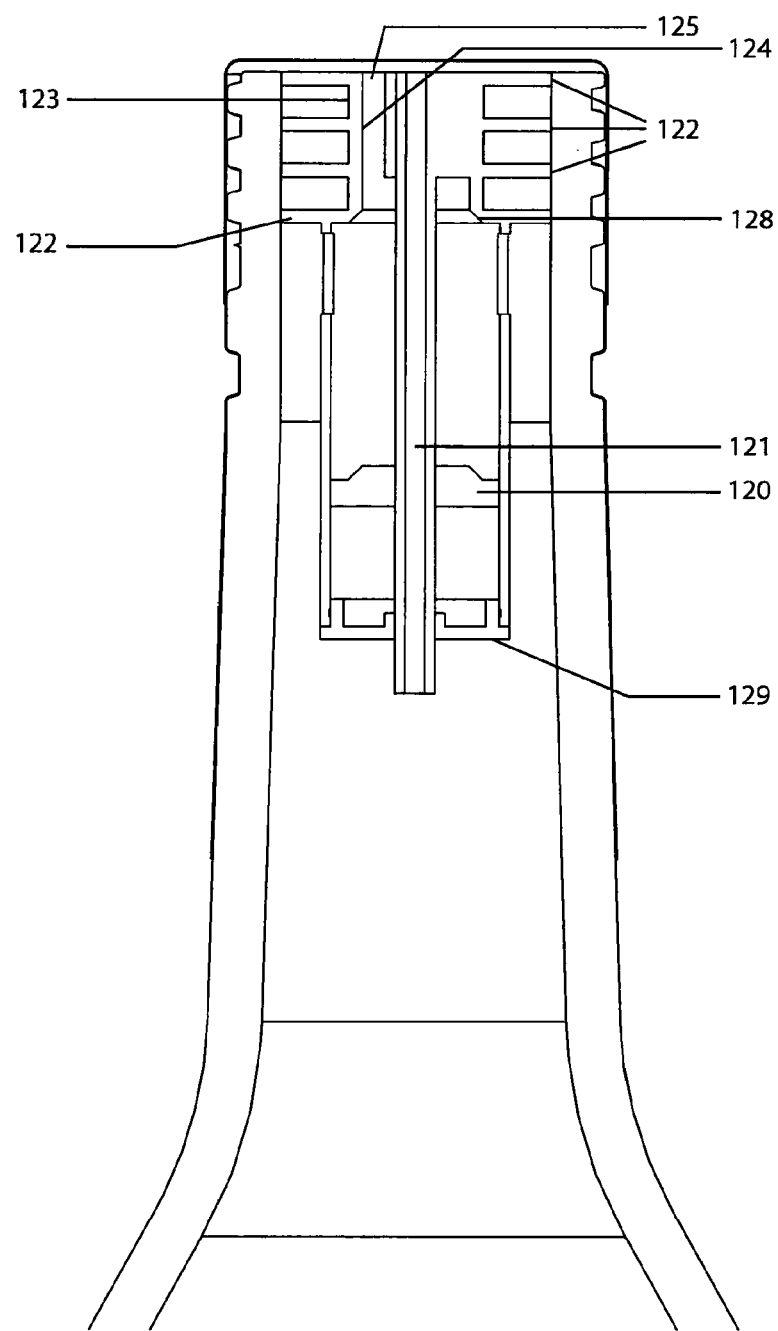
FIG. 16 is a cross sectional view of the pourer shown in FIG. 15 in use.
Figure 17:
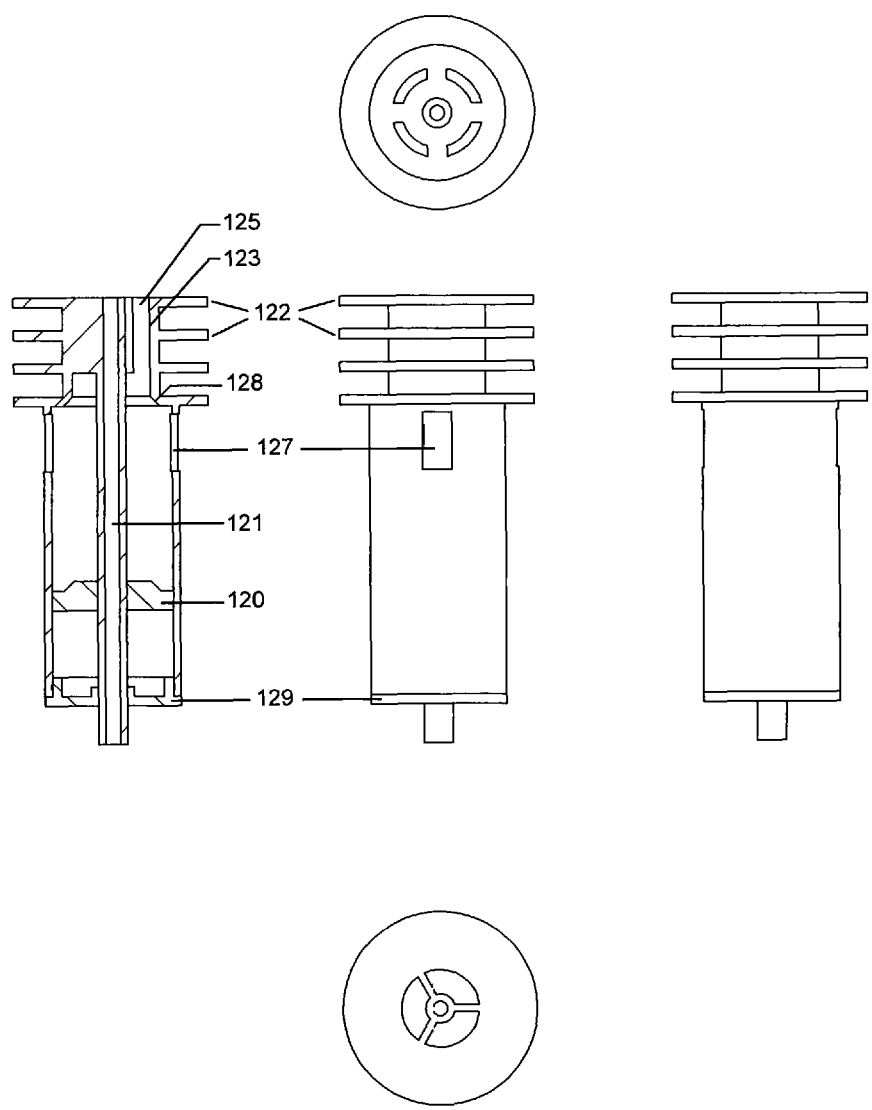
FIG. 17 shows various views of the assembled pourer shown in FIG. 16.

FIGS. 15 to 17 show a further embodiment of the invention wherein the valve is closed by disk-like member (120) mounted on an axial tube (121). Four radially extending members (122) extend radially outwardly from a body (123). The body (123) has an axial passageway (124) extending to an outlet (125) is generally co-planar with the outermost sealing member (122). A conduit (126) communicates with the passageway (124) to form a valve seat (128) arranged to engage the disk (120) when the pourer is inverted. A cap (129) provided with apertures to permit passage of fluid, supports the tubular member (121) within the conduit (126). Rectangular liquid intakes (127) in the conduit adjacent the sealing means (122) allow a flow of liquid into the conduit when the pourer is inverted.

Air intake (121) extends axially of the pourer and provides a guide upon which the disk-shaped valve member (120) may slide as the bottle is inverted or returned to the upright position.

In an alternative embodiment, the air intake opens into the interior chamber of the conduit behind the disc and not directly into the bottle. This arrangement allows the region of reduced pressure behind the falling disc to be replaced with air drawn in from the ambient atmosphere. This arrangement may improve accuracy of dispensing of a metered measure of liquid. When the bottle is returned to the upright position, air is allowed to flow into the bottle to equalise any pressure difference, thereby resetting the pourer for repeated use.

The invention claimed is:
1. A pourer for use in facilitating pouring of a liquid from a bottle, said pourer comprising;
    a conduit having an inlet and an outlet;
    sealing means comprising at least one sealing member extending radially from the conduit and dimensioned to engage an interior surface of a bottle neck;
    an air vent having an inlet and an outlet;
    the inlet and outlet of each of the conduit and air vent being located on opposite sides of the sealing means;
    wherein the pourer has a maximum diameter permitting the pourer to be inserted completely within a bottle neck when in use;
    wherein the conduit includes a chamber having a valve comprising an annular valve seat and a moveable member located in the chamber arranged to engage the valve seat to close the valve when the pourer is inverted;

wherein the outlet of the conduit is located outwardly from an outer surface of the sealing means and further comprises a circular baffle having an external surface co-planar with the outlet of the conduit;

wherein the baffle includes an annular aperture to permit a flow of air from a bottle exterior to the air vent inlet; and wherein the air vent inlet is located in or adjacent the sealing means so that the air vent inlet is in spaced relation to the outlet of the conduit.

2. A pourer as claimed in claim 1, wherein the conduit comprises a cylindrical tube extending from said conduit inlet located inwardly of the sealing means to said conduit outlet.

3. A pourer as claimed in claim 1, wherein the moveable member comprises a ball or disk located within the conduit.

4. A pourer as claimed in claim 1, wherein the conduit extends axially inwardly from the sealing means, the moveable member being moveable within the conduit between an open position remote from the valve seat and a closed position in which the moveable member engages the valve seat to close the valve.

5. A pourer as claimed in claim 1, wherein the baffle is arranged to close a bottle opening when in use.

6. A pourer as claimed in claim 1, wherein the conduit has an inlet adjacent an inner surface of the sealing means.

7. A pourer as claimed in claim 1, wherein the conduit extends inwardly of the sealing means and at least one inlet is provided in the conduit adjacent the sealing means.

8. A pourer as claimed in claim 7, wherein the conduit extends inwardly from the at least one inlet.

9. A pourer as claimed in claim 1, comprising a second valve.

10. A pourer as claimed in claim 4, wherein the conduit extends outwardly of the sealing means by a distance greater than the distance of the inlet of the air vent from the sealing means.

11. A pourer as claimed in claim 1, wherein the outlet of the air vent is located inwardly of the sealing means.

12. A pourer as claimed in claim 1, wherein the air vent extends parallel to a pourer axis and is located at a radial distance greater than a circumference of the conduit.

13. A pourer as claimed in claim 1, wherein the air vent is located circumferentially of the conduit.

14. A bottle having a neck and a pourer in accordance with claim 1.

* * * * *